US008564923B2

(12) United States Patent
Carlino et al.

(10) Patent No.: US 8,564,923 B2
(45) Date of Patent: Oct. 22, 2013

(54) ACCESSORY MODULE PROVIDING A ZONE SELECTIVE INTERLOCKING INTERFACE EXTERNAL TO A TRIP UNIT, AND SYSTEM AND CIRCUIT INTERRUPTER INCLUDING THE SAME

(75) Inventors: Harry J. Carlino, Export, PA (US); Mark O. Zindler, McKees Rocks, PA (US)

(73) Assignee: Eaton Corporation, Cleveland, OH (US)

( * ) Notice: Subject to any disclaimer, the term of this patent is extended or adjusted under 35 U.S.C. 154(b) by 367 days.

(21) Appl. No.: 13/005,771

(22) Filed: Jan. 13, 2011

(65) Prior Publication Data
US 2012/0181152 A1 Jul. 19, 2012

(51) Int. Cl.
*H01H 73/00* (2006.01)
(52) U.S. Cl.
USPC .......................................... 361/115
(58) Field of Classification Search
USPC .......................................... 361/115
See application file for complete search history.

(56) References Cited

U.S. PATENT DOCUMENTS

| 5,341,191 | A | 8/1994 | Crookston et al. |
| 5,910,760 | A | 6/1999 | Malingowski et al. |
| 6,144,271 | A | 11/2000 | Mueller et al. |
| 6,297,939 | B1 | 10/2001 | Bilac et al. |
| 7,948,343 | B2 * | 5/2011 | Carlino et al. ............. 336/115 |
| 2004/0130837 | A1 | 7/2004 | Papallo et al. |
| 2009/0195337 | A1 | 8/2009 | Carlino et al. |

FOREIGN PATENT DOCUMENTS

EP       1 294 068 A2    3/2003

OTHER PUBLICATIONS

Schneider Electric Industries SAS, "ZSI Accessory for NS630b-NW with NSX—GHD16261AA-03", XP002676427, http://www.global-download.schneider-electric.com/85257578007E5C8A/all/94C95F945BD5DA0A88257578004B159B/$File/ghd16261aa.pdf, Jan. 8, 2009, 2 pp.
Schneider Electric Industries SAS, "Compact NSX 100-630A—User Manual", XP002676428, http://www.engineering.schneider-electric.dk/Attachments/ed/use_main/compact_nsx100-630_user_manual.pdf, Jun. 12, 2008, pp. i, 3-4, 41-62.
Siemens AG, "Expansion Plug for Siemens Multiplexer Translator", Siemens Energy and Automation, No. Bulletin 2.21-2A, XP002676429, http://www.sea.siemens.com/us/internet-dms/btiv/CircuitProtection/MoldedCaseBreakers/docs_MoldedCaseBreakers/Siemens-Molded-Case-Circuit-Breakers-Sentron-Sensitrip_Info_Instr_Guide_Expansion_Plug_Siemens_Multiplexer_Translator.pdf, Feb. 6, 2003, 2 pp.
European Patent Office, "International search report and Written Opinion", Jun. 13, 2012, 14 pp.

* cited by examiner

*Primary Examiner* — Rexford Barnie
*Assistant Examiner* — Tien Mai
(74) *Attorney, Agent, or Firm* — Eckert Seamans Cherin & Mellott, LLC; Kirk D. Houser

(57) ABSTRACT

A circuit interrupter includes a circuit breaker frame having an accessory compartment, a trip unit providing a zone selective interlocking function, and an accessory module. The accessory module includes a housing received by the accessory compartment of the circuit breaker frame, and a circuit housed by the housing. The circuit cooperates with the zone selective interlocking function of the trip unit to provide a zone selective interlocking interface external to the trip unit.

8 Claims, 4 Drawing Sheets

ACCESSORY MODULE PROVIDING A ZONE SELECTIVE INTERLOCKING INTERFACE EXTERNAL TO A TRIP UNIT, AND SYSTEM AND CIRCUIT INTERRUPTER INCLUDING THE SAME

BACKGROUND

1. Field

The disclosed concept pertains generally to electrical switching apparatus, such as circuit interrupters, including a trip unit. The disclosed concept also relates to systems including trip units for circuit interrupters. The disclosed concept further relates to accessory modules for circuit interrupters.

2. Background Information

Electrical switching apparatus include, for example, circuit switching devices; circuit interrupters, such as circuit breakers; network protectors; contactors; motor starters; motor controllers; and other load controllers. Electrical switching apparatus such as circuit interrupters and, in particular, circuit breakers of the molded case variety, are well known in the art. See, for example, U.S. Pat. No. 5,341,191.

Circuit interrupters, such as for example and without limitation, circuit breakers, are used to protect electrical circuitry from damage due to an overcurrent condition, such as an overload condition, a short circuit, or another fault condition, such as an arc fault or a ground fault. Molded case circuit breakers typically include a pair of separable contacts per phase. The separable contacts may be operated either manually by way of a handle disposed on the outside of the case or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Industrial circuit breakers often use a circuit breaker frame, which houses a trip unit. See, for example, U.S. Pat. Nos. 5,910,760; and 6,144,271. The trip unit may be modular and may be replaced, in order to alter the electrical properties of the circuit breaker.

It is well known to employ trip units which utilize a microprocessor to detect various types of overcurrent trip conditions and provide various protection functions, such as, for example, a long delay trip, a short delay trip, an instantaneous trip, and/or a ground fault trip. The long delay trip function protects the load served by the protected electrical system from overloads and/or overcurrents. The short delay trip function can be used to coordinate tripping of downstream circuit breakers in a hierarchy of circuit breakers. The instantaneous trip function protects the electrical conductors to which the circuit breaker is connected from damaging overcurrent conditions, such as short circuits. As implied, the ground fault trip function protects the electrical system from faults to ground.

Some known molded case circuit breakers (MCCBs) include a short delay time setting. The actual short delay trip time is intentionally delayed and has a minimum trip time of approximately 37 milliseconds (mS) resulting from the calculation time of a short delay algorithm performed by a microprocessor. The instantaneous feature of these MCCBs is provided by a fixed analog override circuit. A single zener diode is predetermined with a single fixed threshold value. The fixed analog override circuit detects a peak current value and initiates a trip in less than one line cycle. Because the zener diode is a fixed and non-adjustable component, the instantaneous trip threshold is set to a single fixed value. See, for example, U.S. Patent Application Publication No. 2009/0195337.

Zone selective interlocking (ZSI) (e.g., also known as "zone interlocking") controls circuit breakers in order to provide selectivity with relatively very short delay times, irrespective of the number of zones (e.g., without limitation, a line side zone; a load side zone; a number of upstream zones; a number of downstream zones; a number of grading levels) and the location of a fault in a power distribution system. A ZSI input and a ZSI output are provided at each circuit breaker. Interlocking may be applied to faults between phases or earth-faults or both.

As one example, zone interlocking uses a communication mechanism to connect line and load circuit breaker trip units together. When a fault occurs, the trip units communicate to determine which load side circuit breaker is closest to the fault. The trip unit in the circuit breaker closest to the fault overrides any customer-defined delay and opens instantaneously, thereby clearing the fault and allowing the line side circuit breakers to remain closed.

If ZSI is used in several zones, then each circuit breaker affected by, for example, a short circuit current (i.e., upstream of the fault) interrogates the circuit breaker(s) directly downstream of that affected circuit breaker to determine whether the short circuit current is present in or is affecting the adjacent downstream zone. A delay setting is adjusted at each circuit breaker to ensure that the downstream circuit breaker, directly upstream of the fault, has time to interrupt the fault current. The advantages of ZSI increase with additional zones, since time-based selectivity can result in unacceptably long delays at the upstream power source end of the system.

The ZSI communication mechanism employs a pair of conductors between two or more compatible trip units. ZSI makes it possible for programmed trip unit settings to be altered automatically to respond to different fault conditions and locations, thereby localizing the effects of an interruption and providing positive coordination between circuit breakers.

An existing electronic trip unit does not allow for selective coordination of circuit breakers using zone interlocking. Hence, there exists a need to provide this function.

There is room for improvement in electrical switching apparatus, such as circuit interrupters.

There is further room for improvement in systems including trip units for circuit interrupters.

SUMMARY

These needs and others are met by embodiments of the disclosed concept, which provide an accessory module circuit structured to cooperate with a zone selective interlocking function of a trip unit to provide a zone selective interlocking interface external to the trip unit.

In accordance with one aspect of the disclosed concept, a system comprises: a trip unit structured to provide a zone selective interlocking function; and an accessory module comprising: a housing structured to be received by an accessory compartment of a circuit interrupter, and a circuit housed by the housing, the circuit structured to cooperate with the zone selective interlocking function of the trip unit to provide a zone selective interlocking interface external to the trip unit.

As another aspect of the disclosed concept, an accessory module comprises: a housing structured to be received by an accessory compartment of a circuit interrupter; and a circuit housed by the housing, the circuit structured to cooperate with a zone selective interlocking function of a trip unit to provide a zone selective interlocking interface external to the trip unit.

As another aspect of the disclosed concept, a circuit interrupter comprises: a circuit breaker frame comprising an accessory compartment; a trip unit providing a zone selective interlocking function; and an accessory module comprising: a housing received by the accessory compartment of the circuit breaker frame, and a circuit housed by the housing, the circuit cooperating with the zone selective interlocking function of the trip unit to provide a zone selective interlocking interface external to the trip unit.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

As employed herein, the term "processor" shall mean a programmable analog and/or digital device that can store, retrieve, and process data; a computer; a workstation; a personal computer; a microprocessor; a microcontroller; a microcomputer; an ASIC processor; a central processing unit; a mainframe computer; a mini-computer; a server; a networked processor; or any suitable processing device or apparatus.

The disclosed concept is described in association with a three-pole circuit breaker, although the disclosed concept is applicable to a wide range of circuit interrupters having any number of poles.

Figure 1:
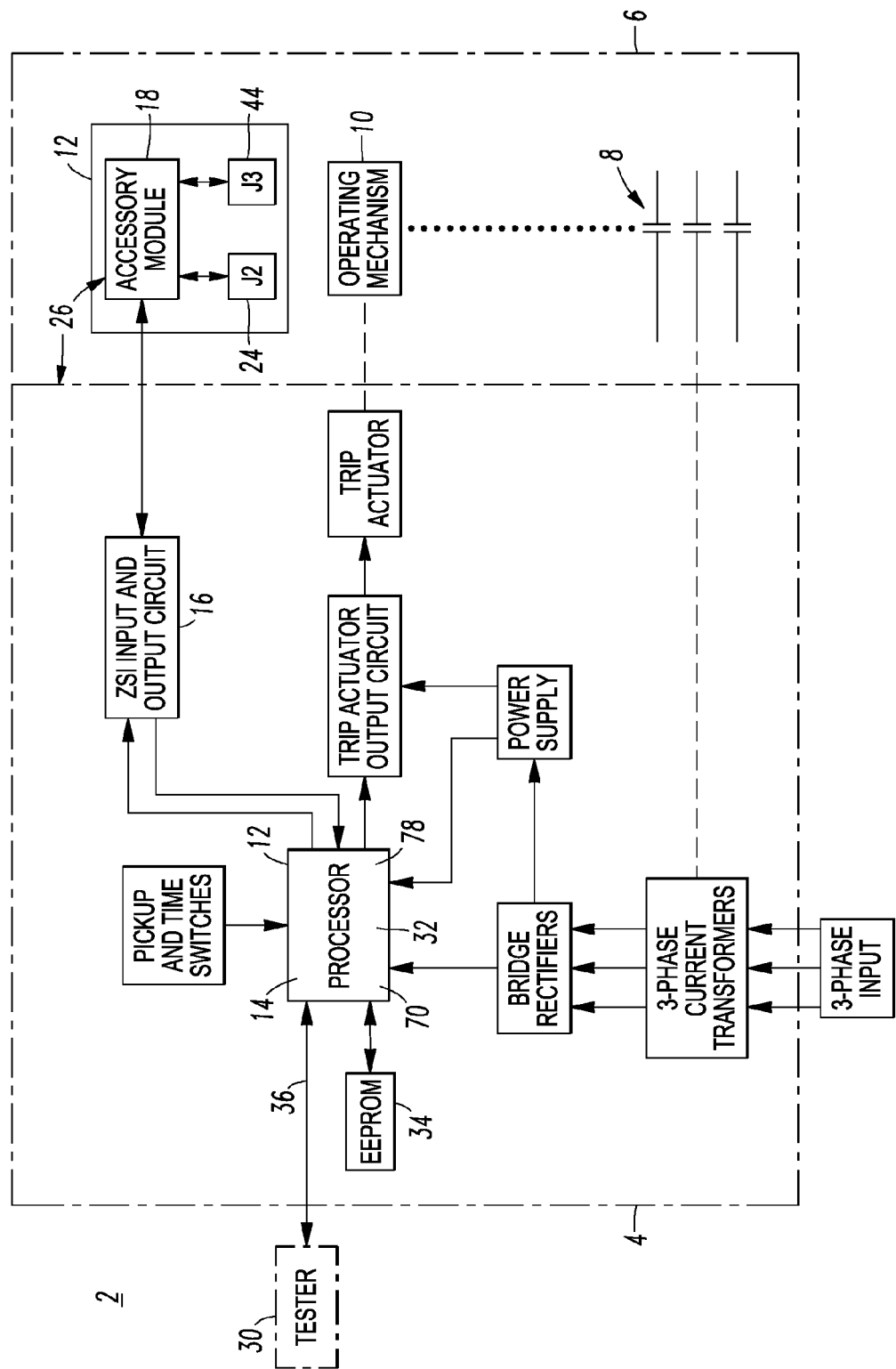
FIG. 1 is a block diagram of a trip unit, an external accessory module and a circuit breaker frame in accordance with embodiments of the disclosed concept.

FIG. 1 shows an electrical switching apparatus or circuit interrupter, such as the example circuit breaker 2 for an electrical circuit. The circuit breaker 2 includes a trip mechanism, such as the example trip unit 4. The example circuit breaker 2 also includes a circuit breaker frame 6 having separable contacts 8, an operating mechanism 10 structured to open and close the separable contacts 8, and an accessory compartment 12. The trip unit 4 cooperates with the operating mechanism 10 to trip open the separable contacts 8. The trip unit 4 includes a processor 12 that provides a zone selective interlocking (ZSI) function 14. The processor 12 includes a ZSI input and output circuit 16.

The accessory compartment 12 includes an accessory module 18 having a housing 20 (FIGS. 3 and 4) received by the accessory compartment 12 and a circuit 22 (FIG. 2) housed by the housing 20. The circuit 22 cooperates with the ZSI function 14 and with the ZSI input and output circuit 16 of the trip unit 4 to provide a zone selective interlocking interface, such as the example connector 24, external to the trip unit 4. The trip unit 4 and the accessory module 18 form a system 26.

The disclosed example electronic trip unit 4 allows for selective coordination via an external customer cable 28 (FIGS. 2 and 4) having a plurality of conductors. The processor 12 of the electronic trip unit 4 is structured to allow the ZSI function 14 to be enabled by a trip unit tester 30 (shown in phantom line drawing in FIG. 1), thereby allowing this function to be turned on as needed as will be explained.

The trip unit 4 further includes a routine 32 of the processor 12, a non-volatile memory, such as the example EEPROM 34, and an interface 36 to the tester 30. The interface 36 and the routine 32 are structured to modify a location of the EEPROM 34 to enable or disable the ZSI function 14. The routine 32 is structured to access the EEPROM 34 to determine if the ZSI function 14 is enabled or disabled.

Figure 2:
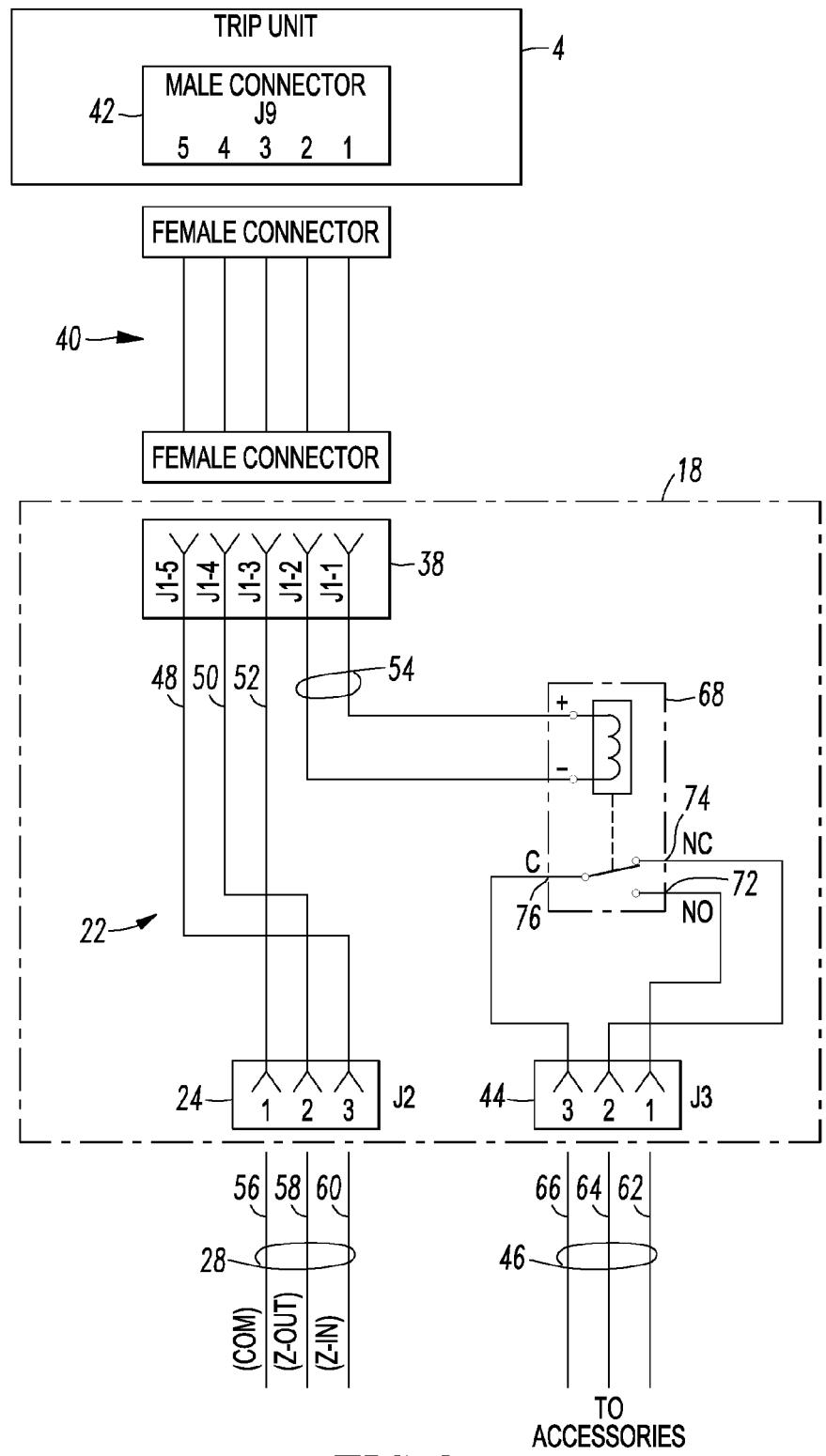
FIG. 2 is a block diagram in schematic form of the accessory module of FIG. 1.
Figure 4:
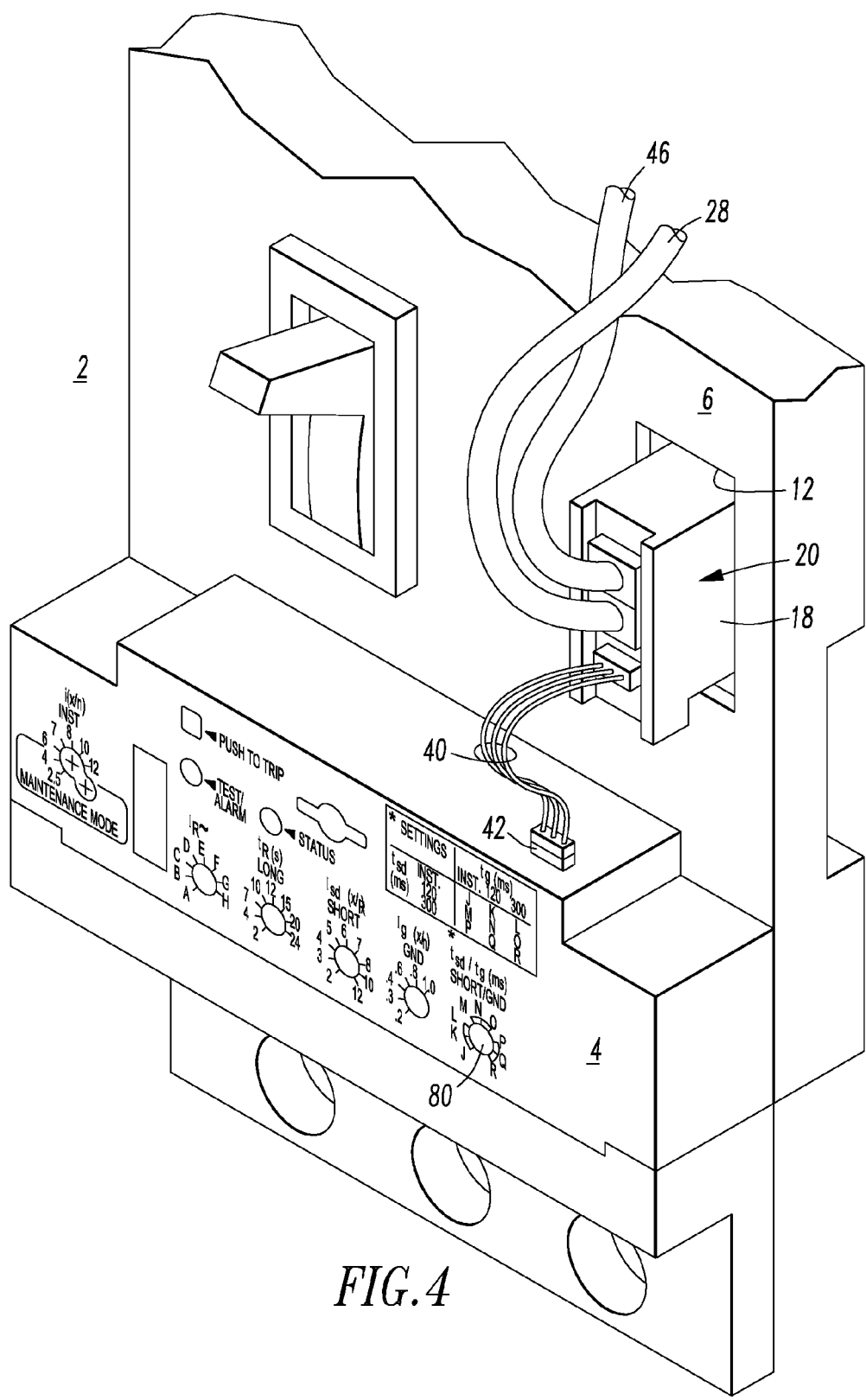
FIG. 4 is an isometric view of a circuit interrupter including the trip unit and the accessory module of FIG. 1.

Referring to FIG. 2, the accessory module 18 and its various interfaces are shown. An example five-pin connector 38 and cable 40 are coupled to a corresponding connector 42 of the trip unit 4. The accessory module circuit 22 includes the example connector 38 having a plurality of conductors structured to interface a plurality of corresponding conductors from the trip unit connector 42. This connector 38 is connected to the circuit 22 (e.g., without limitation, a printed circuit board (PCB)) with wiring to a number of connectors 24,44 for customer cables 28,46. As best shown in FIG. 4, the accessory module 18 is housed in the accessory compartment 12 (e.g., without limitation, right pocket) of the corresponding circuit breaker 2. The customer cables 28,46 exit the circuit breaker 2 in the same or similar manner as connections for a conventional accessory (not shown).

The interface between the trip unit 4 and the accessory module 18 includes the following signals on connector 38: [J1-5]=Z-IN 48, [J1-4]=Z-OUT 50, [J1-3]=COM 52 (common), and [J1-2 and J1-1]=high load alarm 54.

The field wiring and signal definitions on the connector 24 include: [J2-1]=COM 56, [J2-2]=Z-OUT 58, and [J2-3]=Z-IN 60.

The field wiring and signal definitions on the connector 44 include: [J3-1]=normally open contact 62, [J3-2]=normally closed contact 64, and [J3-3]=external contact wetting voltage 66.

In this manner, the circuit 22 receives a plurality of conductors of the external customer cables 28,46 (FIG. 4) at the accessory compartment 12 of the circuit breaker 2.

The circuit 22 can include a relay 68 to provide the high load alarm function. The conditions for operation of the relay 68 by the high load alarm signal 54 from the trip unit 4 are if the circuit breaker load (not shown, but powered through the separable contacts 8 (FIG. 1)) is at or above about 95% of the rated frame current for about 38 seconds. The high load alarm signal 54 is activated by a corresponding routine 70 (FIG. 1) of the trip unit processor 12. This routine 70 can be enabled by a setting set by the trip unit tester 30. The trip unit interface 36 (FIG. 1) is structured to modify a location of the EEPROM 34 to enable or disable the high load alarm signal 54. The routine 70 is structured to access the EEPROM 34 to determine if the high load alarm signal 54 is enabled or disabled. The relay 68 is structured to respond to the high load alarm signal 54 and output external signal 62, which is the example closed state of normally open (NO) contact 72, or external signal 64, which is the example open state of normally closed (NC) contact 74. The external contact wetting voltage 66 is provided to the common 76 of the relay 74 to energize the closed state of the NO contact 72, or to energize the closed state of the NC contact 74.

Figure 3:
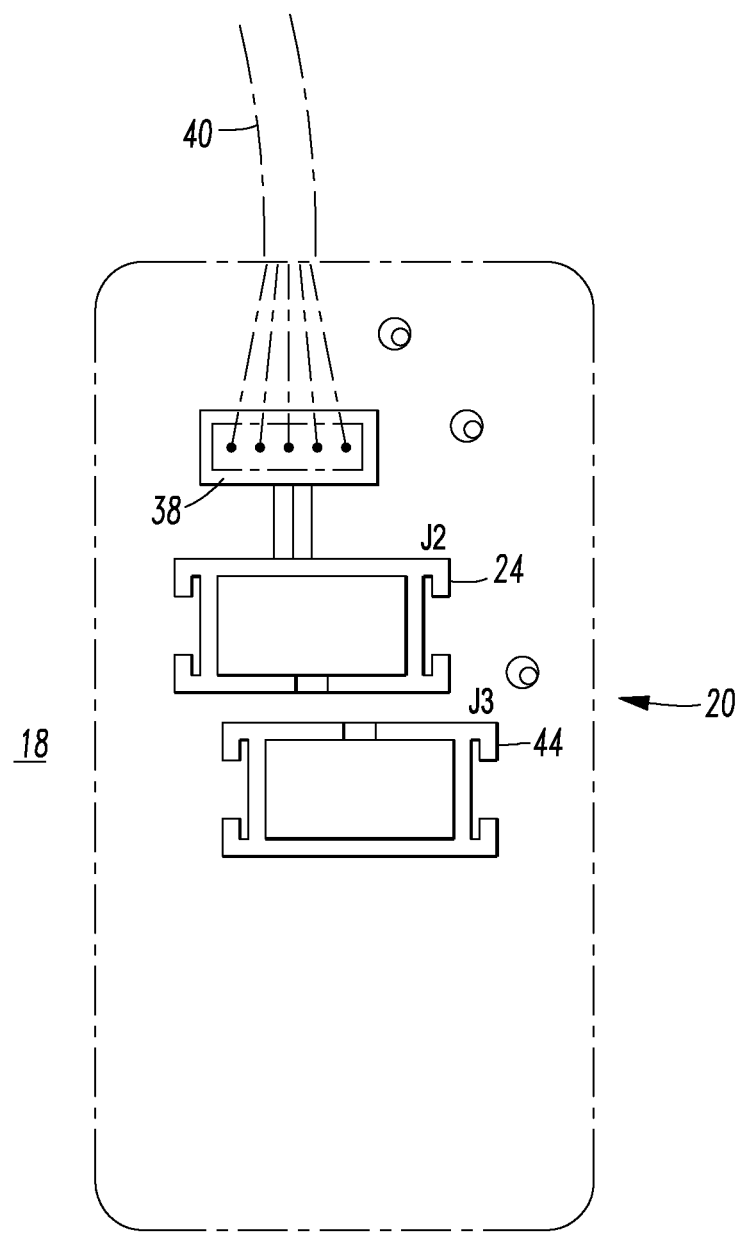
FIG. 3 is an isometric view of the accessory module of FIG. 1.

FIG. 3 shows the accessory module 18 of FIG. 1 including its housing 20 and connectors 38,24,44, along with the cable 40 (shown in phantom line drawing) to the trip unit 4.

FIG. 4 shows the circuit breaker 2 including the trip unit 4 and the accessory module 18 of FIG. 1 including its housing 20 in the accessory compartment 12, and the local cable 40 and the external cables 28,46.

Zone selective interlocking (ZSI) is provided for the short delay and the ground fault delay tripping functions of the trip unit 4 for improved system protection. A non-limiting example of a ZSI system includes a first circuit breaker (not shown, but see circuit breaker 2) used as an upstream circuit breaker and a second circuit breaker (not shown) used as a downstream circuit breaker. The Z-OUT conductor (not shown, but see conductor 58) of the downstream circuit breaker is connected to the Z-IN conductor 60 of the upstream circuit breaker. Also both COM (common) conductors 56 are connected. There could be more circuit breakers (not shown) added in a similar fashion to form a zone of protection.

For faults outside the zone of protection, the trip unit on the circuit breaker nearest the fault sends an interlocking signal (Z-OUT) to the trip unit of the upstream circuit breaker, which receives the interlocking signal (Z-IN). The interlocking signal restrains immediate tripping of the upstream circuit breaker until its programmed coordination time is reached. ZSI applied correctly can reduce damage and/or avoid tripping of non-faulted circuits due to circuit or ground fault conditions.

Tables 1 to 3, below, show settings and outcomes (i.e., Both trip; downstream circuit breaker (Dn) trips; upstream circuit breaker (Up) trips) for two example circuit breakers for the conditions shown in the corresponding heading.

TABLE 1

| | | No Interlocks/Enabled Upstream | | |
|---|---|---|---|---|
| | | INST | 120 mS | 300 mS |
| Downstream | INST | Both ~53 mS | Both ~53 mS | Both ~53 mS |
| | 120 mS | Both ~53 mS | Both ~53 mS | Both ~53 mS |
| | 300 mS | Both ~53 mS | Both ~53 mS | Both ~53 mS |

TABLE 2

| | | Interlocked/Downstream Self Interlocked Upstream | | |
|---|---|---|---|---|
| | | INST | 120 mS | 300 mS |
| Downstream | INST | Both ~37 mS | Dn ~37 mS | Dn ~37 mS |
| | 120 mS | Up ~37 mS | Both ~87 mS | Dn ~87 mS |
| | 300 mS | Up ~37 mS | Up ~87 mS | Both ~270 mS |

TABLE 3

| | | Interlocked/No Self Interlocks Upstream | | |
|---|---|---|---|---|
| | | INST | 120 mS | 300 mS |
| Downstream | INST | Both ~37 mS | Dn ~53 mS | Dn ~53 mS |
| | 120 mS | Both ~37 mS | Dn ~53 mS | Dn ~53 mS |
| | 300 mS | Both ~37 mS | Dn ~53 mS | Dn ~53 mS |

As can be seen from Tables 1 to 3, the three example SDT time settings are INST (instantaneous), 120 mS and 300 mS. Self interlocking is used for a single circuit breaker in order that the trip times are controlled by a SDT time switch 80 (FIG. 4). If the ZSI function 14 (FIG. 1) is enabled, then a single circuit breaker 2 behaves as shown in the tables (i.e., whether self interlocked (Table 2) or not (Table 3)).

The trip unit processor 12 (FIG. 1) is structured to provide a plurality of different short time delay settings and includes a routine 78 structured to modify the settings as a function of the ZSI function 14. The routine 78 is also structured to detect a self interlocking condition when the zone in signal (Z-IN) 60 is coupled to the zone out signal (Z-OUT) 58. A single circuit breaker, such as 2, with the ZSI function 14 enabled will not trip at the programmed time settings, unless it is self interlocked (i.e., as was described with Z-IN 60 coupled to Z-OUT 58).

The ZSI function 14 and the high load alarm relay 68 (FIG. 2) are different functions. They use the same example accessory module 18 when both functions are selected by the customer. The trip unit tester 30 is used to enable the ZSI function 14 and/or the high load alarm relay 68 by programming suitable settings into suitable locations of the EEPROM 34.

Although separable contacts 8 are disclosed, suitable solid state separable contacts may be employed. For example, the disclosed circuit breaker 2 includes a suitable circuit interrupter mechanism, such as the separable contacts 8 that are opened and closed by the operating mechanism 10, although the disclosed concept is applicable to a wide range of circuit interruption mechanisms (e.g., without limitation, solid state switches like FET or IGBT devices; contactor contacts) and/or solid state based control/protection devices (e.g., without limitation, drives; soft-starters; DC/DC converters) and/or operating mechanisms (e.g., without limitation, electrical, electro-mechanical, or mechanical mechanisms).

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A system comprising:
   a trip unit structured to provide a zone selective interlocking function; and
   an accessory module comprising:
      a housing structured to be received by an accessory compartment of a circuit interrupter, and
      a circuit housed by said housing, said circuit structured to cooperate with the zone selective interlocking function of said trip unit to provide a zone selective interlocking interface external to said trip unit,
   wherein said trip unit comprises a first connector including a plurality of conductors;
   wherein said accessory module further comprises a second connector including a plurality of conductors structured to interface the plurality of conductors of said first connector;
   wherein the plurality of conductors of said first and second connectors define a high load alarm signal from said trip unit to said accessory module; and wherein said accessory module further comprises a relay and a third connector including a plurality of conductors, said relay being structured to respond to the high load alarm signal and output an external signal on the plurality of conductors of said third connector.

2. The system of claim 1 wherein the plurality of conductors of said third connector are structured to receive an external voltage to energize a closed state of a normally open contact or the energize a closed state of a normally closed contact.

3. The system of claim 1 wherein said trip unit comprises a processor structured to output the high load alarm signal to said accessory module in response to a circuit interrupter load being at or above a predetermined current for a predetermined time.

4. The system of claim 3 wherein said processor includes a routine structured to provide the high load alarm signal; wherein said trip unit further comprises a non-volatile memory and an interface to a tester; wherein the interface of said trip unit is structured to modify the non-volatile memory to enable or disable the high load alarm signal; and wherein the routine is structured to access the non-volatile memory to determine if the high load alarm signal is enabled or disabled.

5. An accessory module comprising:
a housing structured to be received by an accessory compartment of a circuit interrupter; and
a circuit housed by said housing, said circuit structured to cooperate with a zone selective interlocking function of a trip unit to provide a zone selective interlocking interface external to said trip unit,
wherein said circuit comprises a connector including a plurality of conductors structured to interface a plurality of conductors from said trip unit,
wherein said connector is a first connector; and wherein said circuit further comprises a relay and a second connector including a plurality of conductors, said relay being structured to respond to a high load alarm signal and output an external signal on the plurality of conductors of said second connector.

6. A circuit interrupter comprising:
a circuit breaker frame comprising an accessory compartment;
a trip unit providing a zone selective interlocking function; and
an accessory module comprising:
a housing received by the accessory compartment of said circuit breaker frame, and
a circuit housed by said housing, said circuit cooperating with the zone selective interlocking function of said trip unit to provide a zone selective interlocking interface external to said trip unit,
wherein said trip unit comprises a processor structured to output a high load alarm signal to said accessory module in response to a load controlled by said circuit interrupter, said load having a current at or above a predetermined current for a predetermined time; and wherein said accessory module further comprises a relay structured to respond to the high load alarm signal and output an external signal from one of a normally open contact and a normally closed contact.

7. A circuit interrupter comprising:
a circuit breaker frame comprising an accessory compartment;
a trip unit providing a zone selective interlocking function; and
an accessory module comprising:
a housing received by the accessory compartment of said circuit breaker frame, and
a circuit housed by said housing, said circuit cooperating with the zone selective interlocking function of said trip unit to provide a zone selective interlocking interface external to said trip unit,
wherein said trip unit comprises a processor structured to provide a plurality of different short time delay settings and a routine structured to modify said settings as a function of said zone selective interlocking function;
wherein said accessory module further comprises an external connector including a first conductor for a zone out signal and a second conductor for a zone in signal; and wherein said routine is further structured to detect a self interlocking condition when said zone in signal is coupled to said zone out signal.

8. A circuit interrupter comprising:
a circuit breaker frame comprising an accessory compartment;
a trip unit providing a zone selective interlocking function; and
an accessory module comprising:
a housing received by the accessory compartment of said circuit breaker frame, and
a circuit housed by said housing, said circuit cooperating with the zone selective interlocking function of said trip unit to provide a zone selective interlocking interface external to said trip unit,
wherein said trip unit comprises a processor structured to output a high load alarm signal to said accessory module in response to a load controlled by said circuit interrupter, said load having a current at or above a predetermined current for a predetermined time; and wherein said accessory module further comprises a relay structured to respond to the high load alarm signal and output an external signal from one of a normally open contact and a normally closed contact.

* * * * *